United States Patent [19]
Fell et al.

[11] 3,728,905
[45] Apr. 24, 1973

[54] BELT TRANSMISSION HAVING MECHANISM FOR REVERSE GRINDING

[75] Inventors: Ferol S. Fell, Newton; Lowell J. Goering, Moundridge; William D. Long, Hesston, all of Kans.

[73] Assignee: Hesston Corporation, Hesston, Kans.

[22] Filed: Jan. 7, 1972

[21] Appl. No.: 216,062

[52] U.S. Cl. .................................. 74/220, 74/15.2
[51] Int. Cl. ........................... F16h 9/04, F16h 37/06
[58] Field of Search .................. 74/220, 242.15 R, 74/15.2

[56] References Cited

UNITED STATES PATENTS

| | | | |
|---|---|---|---|
| 2,936,840 | 5/1960 | White | 74/220 X |
| 3,188,876 | 6/1965 | Mitchell et al. | 74/203 |
| 3,477,439 | 11/1969 | Hamouz et al. | 74/220 X |

*Primary Examiner*—Leonard H. Gerin
*Attorney*—Schmidt, Johnson, Hovey & Williams

[57] ABSTRACT

A power transmission for farm implements, such as forage harvesters, having a rotor provided with chopping blades, is operable to drive the rotor in reverse during sharpening of the blades. A pair of belt and pulley assemblies are normally driven alternately to effect either forward or reverse rotation of one or more output shafts. Upon the removal of shear or break pins, installation of a stud and substitution of one link for another, a direct drive of the rotor from a power shaft is released and the rotor is reversed by operation of both assemblies simultaneously.

12 Claims, 6 Drawing Figures

BELT TRANSMISSION HAVING MECHANISM FOR REVERSE GRINDING

An important object of the present invention is to provide a power transmission which brings together a pair of belt and pulley assemblies, disposed externally of a transmission housing, with one or more trains of chain and sprocket wheel units internally of the housing, in such manner as to drive a number of output shafts forwardly or in reverse as the assemblies are actuated alternately.

Another important object of the instant invention is to provide a power transmission of the aforementioned type in which is included a direct drive from a power shaft to a driven shaft, together with an arrangement for rotating the driven shaft in reverse by the power shaft through the belt and pulley assemblies upon disconnection of the driven shaft from the power shaft.

Figure 1:
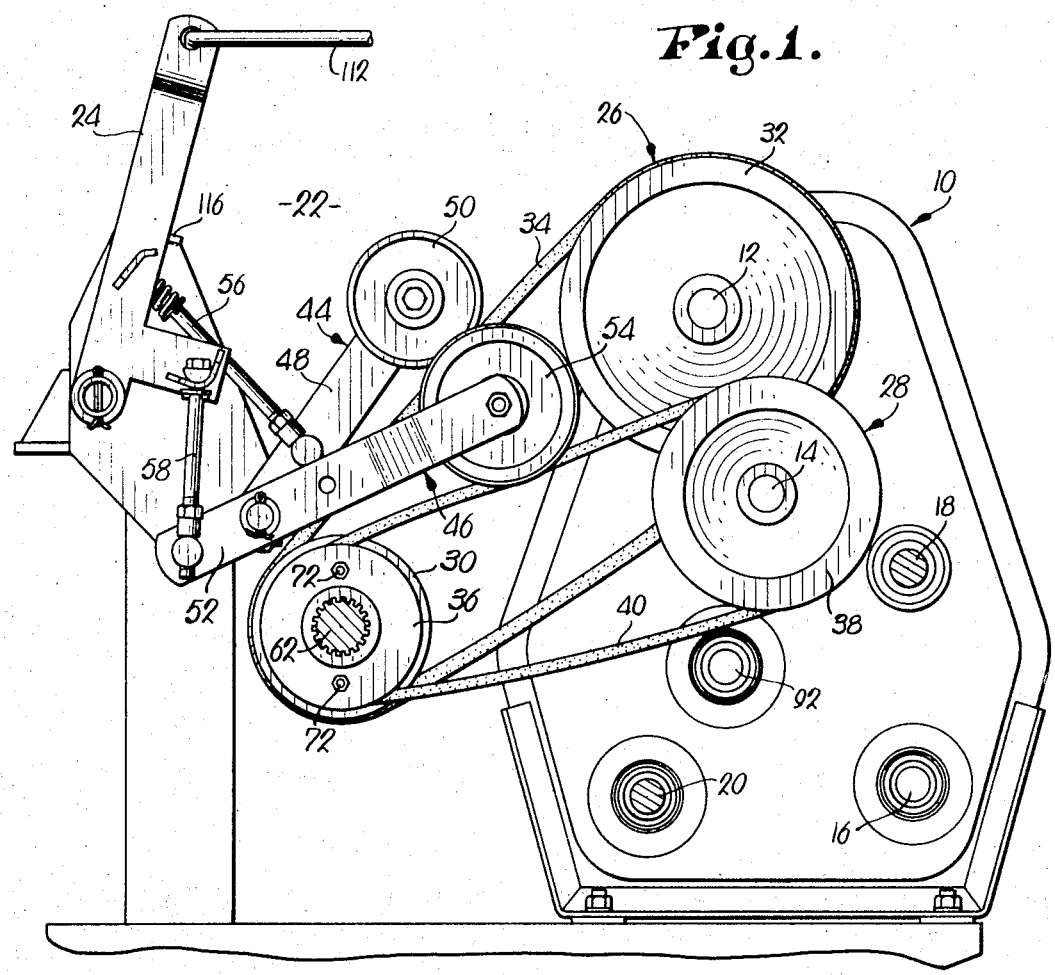
FIG. 1 is a side elevational view of a belt transmission having mechanism for reverse grinding made in accordance with the present invention.

The power transmission illustrated in the drawings includes a housing 10 provided with a pair of input shafts 12 and 14 and three output shafts 16, 18 and 20. A shiftable control 22 includes a manual lever 24 shown in neutral by FIG. 1. When the lever 24 is swung clockwise toward the housing 10 it operates a first drive unit 26 and when the lever 24 is swung counterclockwise away from the housing 10 it operates a second drive unit 28.

The belt and pulley assembly of the unit 26 includes a pair of grooved pulleys 30 and 32 interconnected by a continuous belt 34, and the belt and pulley assembly of the unit 28 includes a pair of grooved pulleys 36 and 38 interconnected by a continuous belt 40. The pulleys 30 and 36 are normally driven by a unidirectional power shaft 42 common to the units 26 and 28, the pulleys 32 and 38 being secured to the input shafts 12 and 14 respectively.

Figures 2, 3, 4:
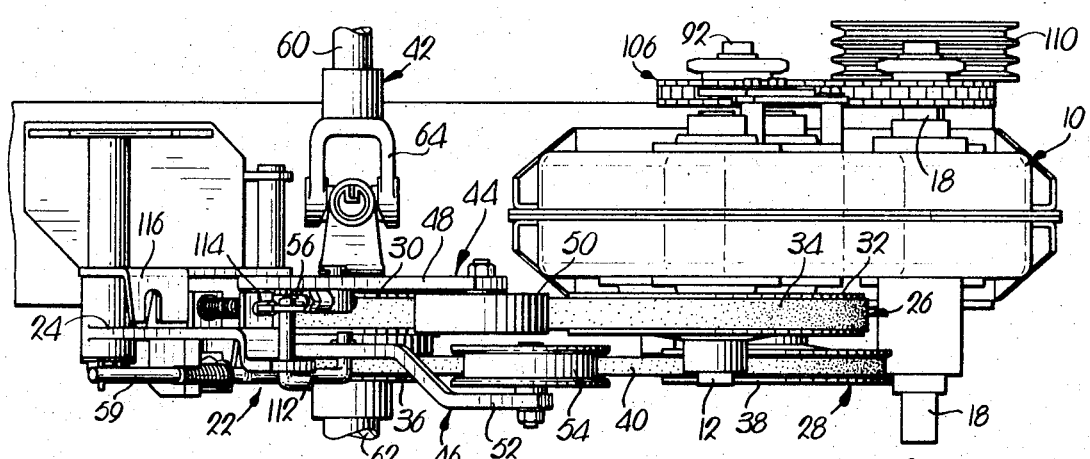
FIG. 2 is a view similar to FIG. 1 showing the position of certain components during reverse grinding.
FIG. 3 is a plan view of the transmission as shown in FIG. 2.
FIG. 4 is an exploded perspective view of the power shaft and pulleys thereon.

The control 22 includes additionally, tighteners 44 and 46 for the belts 34 and 40 respectively. The tightener 44 has a swingable arm 48 provided with a roller 50 engageable with the belt 34, and the tightener 46 has a swingable arm 52 provided with a roller 54 engageable with the belt 40. Links 56 and 58 pivotally connect the arms 48 and 52 respectively with the lever 24. A third spring-loaded link 59 pivotally interconnects the lever 24 and the arm 52 when the link 58 is released from the arm 52 as shown in FIG. 2. As noted, the links 58 and 59 join with the arm 52 on opposite sides of its axis of swinging movement.

The power shaft 42 has a pair of sections 60 and 62 corresponding to the units 26 and 28 respectively, the pulley 36 being rigidly connected to the shaft section 62. The shaft section 60, driven from any suitable power source (not shown) has a universal joint 64 rigid to a plate 66 which is in turn provided with an integral stub tube 68 passing loosely through the pulley 30 and loosely receiving the shaft section 62. The plate 66, the pulley 30 and the pulley 36 are normally clamped together by a pair of diametrically opposed shear pins or bolts 70 provided with nuts 72, presenting a releasable connection between the shaft sections 60 and 62, and therefore, between the pulleys 30 and 36. The plate 66 normally covers a tapped opening 74 in the pulley 30 and is provided with a hole 76 adapted to receive a stud 78. Upon removal of the bolts 70 and rotation of the pulley 30 and the plate 66 relatively, the stud 78 may be passed through the hole 76 and into the opening 74 to clamp the plate 66 to the pulley 30, resulting in free rotation of the stub tube 68 relative to the shaft section 62, as well as free relative rotation of the pulleys 30 and 36. By forcing the operator to remove the stud 78 before replacing the bolts 70, the shearing of the bolts 70 may take place either between the pulleys 30 and 36 or between the pulley 30 and the plate 66 in the event of an excessive load on either or both of the pulleys 30 and 36. The use of the stud 78 may, however, be eliminated by providing a rigid or integral connection between the pulley 30 and the shaft section 60, e.g., between the plate 66 and the pulley 30, capable of withstanding overloads. But with such construction, the shear pins 70 would not provide for safety in the event of excessive torsional loads on the pulley 30.

Figure 6:
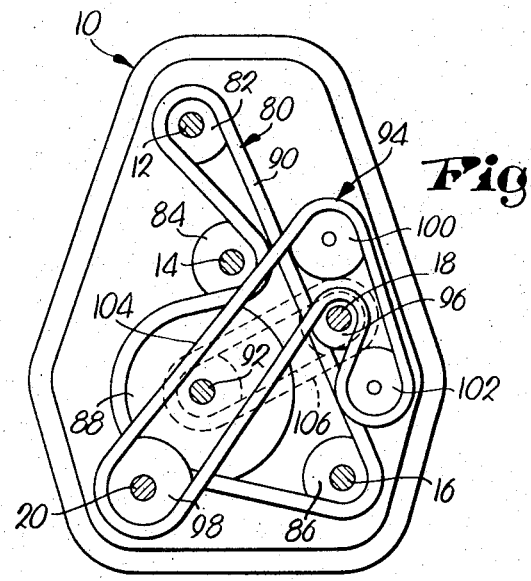
FIG. 6 is a side elevational view of the housing with one side wall thereof removed.
Figure 5:
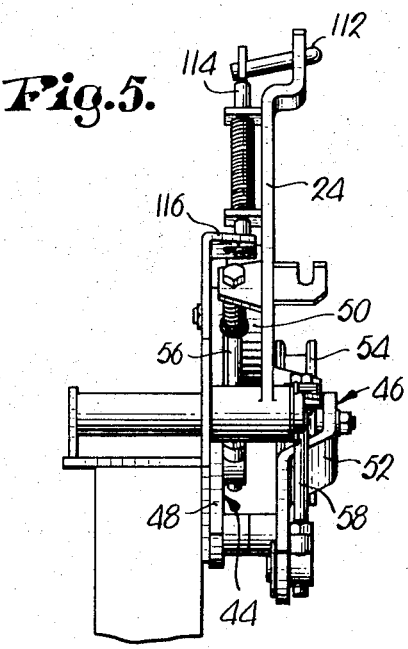
FIG. 5 is an end elevational view of the transmission as shown in FIG. 1.

Structure 80 within the housing 10 (FIG. 6) is provided for rotating the output shaft 16 in either of two directions from the units 26 and 28. The structure 80 includes a train of rotatable elements 82, 84, 86 and 88, such as sprocket wheels, and a power transmitting member 90 such as a continuous chain connecting the elements 82–88. The elements 82, 84 and 86 are rigid to the shafts 12, 14 and 16 respectively and the element 88 is secured to a shaft 92. the back wrap of the member 90 around the element 84 causes the latter to rotate oppositely to the elements 82, 86 and 88, resulting in rotation of the output shaft 16 in either of two directions, depending upon which of the two units 26 or 28 is driven.

Auxiliary structure 94 within the housing 10 is provided for rotating the output shafts 18 and 20 in either of two directions from the units 26 and 28. The structure 94 includes a train of rotatable elements 96, 98, 100 and 102, such as sprocket wheels, and a power transmitting member 104, such as a continuous chain connecting the elements 96–102. The elements 96 and 98 are rigid to the shafts 18 and 20 respectively and the elements 100 and 102 are idlers. A chain and sprocket wheel assembly 106 interconnects the shafts 18 and 92 exteriorly of the housing 10 such that the structure 94 is driven by the structure 80. The back wrap of the member 104 around the element 96 causes the latter to rotate oppositely to the elements 98–102, resulting in rotation of the output shafts 18 and 20 in either of two directions, depending upon which of the two units 26 or 28 is driven.

OPERATION

One adaptation of the transmission above described is in connection with an otherwise conventional harvester for cutting and chopping forage crops. Such implements are provided with a transverse, crop cutting, reciprocable sickle, followed by inclined gathering chains that direct the cut crop to a front pair of superimposed feed rolls. A rear pair of superimposed feed rolls direct the crop to a rotating chopper having spirally arranged chopper blades. The hub 108 of such chopper is shown in FIG. 4 connected directly to the shaft section 62. The sickle and the gathering chains are driven from a pulley 110 (FIG. 3) connected to the output shaft 16. The upper feed rolls are normally driven in one direction by the output shaft 18 and the lower feed rolls are driven in the opposite direction by the output shaft 20. The shaft section 60 is driven continuously in one direction from the power take-off shaft of the tractor, in the case of a pull type harvester, or from the prime mover of a self-propelled harvester.

To place the transmission in operation, a push-pull rod 112 connected with the lever 24 is turned to withdraw a spring-loaded plunger 114 from a slotted keeper 116, thereby releasing the lever 24 for movement from its neutral position. The rod 112 may then be pulled to swing the lever 24 clockwise, viewing FIGS. 1 and 3, to its forward drive position, and the plunger 114 is then released to lock against one edge of the keeper 116.

The lever 24 pushes on the links 56 and 58 to swing the arms 48 and 52, moving the roller 50 into position for holding the belt 34 taut while the roller 54 withdraws to permit the belt 40 to remain slack. The belt 34 is driven by the pulley 30 to drive the pulley 32 and the shaft 12. This rotation of the shaft 12 drives the sprocket wheels 82–88 and the chain 90 of the structure 80, causing the shafts 16 and 92 to rotate in the same direction as the shaft 12 and causing the shaft 14 to rotate oppositely to the shaft 12. The pulley 38 on shaft 14 rotates idly within the loose belt 40, and the shaft 16 rotates the pulley 110 to operate the sickle and the gathering chains of the forage harvester header.

Rotation of the shaft 92 drives the assembly 106 to drive the sprocket wheels 96–102 and the chains 104 of the structure 94. The shaft 18 thereby drives the upper feed rolls in one direction as the shaft 20 drives the lower feed rolls in the opposite direction.

In the event of clogging or choking it may be desirable to reverse the gathering chains and the feed rolls. The operator then turns the rod 112 to release the plunger 114 from the keeper 116 and pushes the rod 112 so as to swing the lever 24 anticlockwise, but the plunger 114 is desirably not operable in association with the keeper 116 to hold the lever 24 in its reverse position. This swings the roller 50 away from the belt 34 and swings the roller 54 to an operative position tightening the belt 40 such that it is driven from the pulley 36. In this position of the control 22, the structure 80 is driven by its sprocket wheel 84 rather than from its sprocket wheel 82. The output shafts 16, 18 and 20 are, therefore, driven in reverse as the pulley 32 rotates idly in the loose belt 34.

The cutter blades of the chopper rotor must be sharpened from time to time and such is best accomplished while rotating such rotor in reverse. To this end, the bolts 70 are removed, thereby releasing the direct drive of the rotor hub 108 from the section 60 of the power shaft 42. As a safety factor the stud 78 cannot be inserted into the opening 74 until the latter is aligned with the hole 76.

When stud 78 clamps the plate 66 to the pulley 30, the shaft section 60 rotates the stub tube 68 relative to the shaft section 62 and drives the pulley 30 relative to the pulley 36. The connection of the link 58 with the arm 52 is then released (FIG. 2) and the link 59 is connected between the lever 24 and the arm 52.

Thus, when the lever 24 is swung to its forward position shown in FIG. 2, both of the arms 48 and 52 are actuated by the links 56 and 59 respectively, causing rollers 50 and 54 to tighten both of the belts 34 and 40. The belt 40 drives the pulley 38, the shaft 14, and therefore, the structure 80 in reverse. This rotates the shaft 12 and the pulley 32 in reverse, but instead of rotating idly in the belt 34, the pulley 32 now drives the belt 34, the pulley 36, and therefore, the hub 108 in reverse while the blades of the chopper are being sharpened.

Having thus described the invention, what is claimed as new and desired to be secured by Letters Patent is:

1. In a power transmission:
    a pair of input shafts;
    at least one output shaft;
    a shiftable control;
    a first drive unit coupled with one of the input shafts for rotating the latter when the control is shifted in one direction;
    a second drive unit coupled with the other of said input shafts for rotating the latter when the control is shifted in the opposite direction; and
    structure coupling the input shafts with the output shaft for rotating the latter in one direction when said one input shaft is rotated by the first unit and in the opposite direction when said other input shaft is rotated by the second unit.

2. A transmission as claimed in claim 1 wherein said structure comprises a train of rotatable elements secured to said one input shaft, to said second input shaft and to said output shaft respectively, and a power transmitting member connecting the elements in an arrangement to rotate the elements on the input shafts in opposite directions.

3. A transmission as claimed in claim 1 wherein is provided a unidirectional power shaft common to said units.

4. A transmission as claimed in claim 3 wherein said power shaft is provided with a section for each of said units respectively and a releasable connection between the sections, said control having parts for driving the units simultaneously from the second unit to the first unit when the sections are released and the control is shifted in said one direction whereby to drive one of the sections oppositely to the other section.

5. A transmission as claimed in claim 3 wherein each unit includes a belt and pulley assembly between the power shaft and the corresponding input shaft, and wherein said control is provided with a tightener for each belt respectively.

6. A transmission as claimed in claim 5 wherein one of the tighteners holds the belt of one assembly taut while the other tightener releases the belt of the other assembly when the control is shifted in said one direction, and wherein said other tightener holds the belt of the other assembly taut while the one tightener releases the belt of the one assembly when the control is shifted in said opposite direction.

7. In a power transmission:
    a unidirectional power shaft having a pair of sections;

a releasable connection between said sections;

a drive unit coupled with each of said sections respectively;

a control shiftable to and from a position for driving said units from said sections; and structure coupled with said units for driving one of said sections oppositely to the other of said sections when said connection is released and said control is in said position.

8. A transmission as claimed in claim 7, said structure being provided with an output shaft, said control having parts selectively operable to effect operation of said units alternately to drive the output shaft in either of two directions when the sections are interconnected.

9. A transmission as claimed in claim 7, each of said units being a belt and pulley assembly, said control including a belt tightener for each assembly respectively.

10. A transmission as claimed in claim 9, each assembly including a pulley secured to the corresponding section of said power shaft, said connection being shear pin means normally interconnecting said pulleys on said sections.

11. A transmission as claimed in claim 9, said control including a swingable lever and a link connecting each tightener respectively with said lever.

12. A transmission as claimed in claim 11, said structure being provided with an output shaft, one of said links normally connected with one of said tighteners being releasable, said control having a third link adapted for interconnecting the lever and said one tightener when said one link is released for effecting operation of said units alternately upon swinging of the lever whereby to drive the output shaft in either of two directions when the sections are interconnected.

* * * * *